United States Patent
Gandhi et al.

(10) Patent No.: US 6,243,781 B1
(45) Date of Patent: Jun. 5, 2001

(54) AVOIDING DEADLOCK BY STORING NON-POSTED TRANSACTIONS IN AN AUXILIARY BUFFER WHEN PERFORMING POSTED AND NON-POSTED BUS TRANSACTIONS FROM AN OUTBOUND PIPE

(75) Inventors: Wishwesh Gandhi; Tuong Trieu, both of Folsom; Ashish Gadagkar, Sunnyvale; Zohar Bogin, Folsom; David D. Lent, Placerville, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/205,051

(22) Filed: Dec. 3, 1998

(51) Int. Cl.[7] ........................................ G06F 13/14
(52) U.S. Cl. ............................ 710/129; 710/128
(58) Field of Search ........................ 710/126–130

(56) References Cited

U.S. PATENT DOCUMENTS

| | | | |
|---|---|---|---|
| 5,524,220 | * 6/1996 | Verma et al. | 712/207 |
| 5,546,546 | * 8/1996 | Bell et al. | 710/112 |
| 5,613,075 | * 3/1997 | Wade et al. | 710/107 |
| 5,638,534 | * 6/1997 | Mote, Jr. | 711/158 |
| 5,694,556 | * 12/1997 | Neal et al. | 710/128 |
| 5,870,567 | * 2/1999 | Hausauer et al. | 710/101 |
| 5,938,739 | * 8/1999 | Collins et al. | 710/5 |
| 5,953,538 | * 9/1999 | Duncan et al. | 710/22 |
| 6,076,130 | * 6/2000 | Sharma | 710/129 |
| 6,085,274 | * 7/2000 | Seeman | 710/129 |
| 6,098,134 | * 8/2000 | Michels et al. | 710/108 |
| 6,138,192 | * 10/2000 | Hausauer | 710/100 |

OTHER PUBLICATIONS

Solaris, E. & Willse, G., "PCI Platform Hardware Architecture," PCI Hardware and Software Architecture & Design, 3rd Edition, Annabooks (1996), pp. 21–23.

* cited by examiner

Primary Examiner—Sumati Lefkowitz
(74) Attorney, Agent, or Firm—Blakely, Sokoloff, Taylor & Zafman LLP

(57) ABSTRACT

In a bus resource having an outbound pipe for processing both non-posted and posted transactions in a FIFO manner, a rejected non-posted transaction at the head of the outbound pipe is moved aside and into an auxiliary buffer to avoid a potential blockage of the outbound pipe. The auxiliary buffer is for holding transaction information and return data of the rejected non-posted transaction. The rejected transaction is eventually completed from the auxiliary buffer as determined by an arbiter.

14 Claims, 3 Drawing Sheets

AVOIDING DEADLOCK BY STORING NON-POSTED TRANSACTIONS IN AN AUXILIARY BUFFER WHEN PERFORMING POSTED AND NON-POSTED BUS TRANSACTIONS FROM AN OUTBOUND PIPE

BACKGROUND INFORMATION

This invention is generally related to computer systems and more particularly to techniques for avoiding deadlock when performing bus transactions from an outbound pipe of a bridge.

Computer systems use a bridge between two buses to allow devices on one bus to communicate with devices on the other bus. FIG. 1 shows such a conventional computer system 102 which complies with the popular *Peripheral Components Interconnect (PCI) Specification*, Revision 2.1, Jun. 1, 1995. The system 102 has a processor 104, which in certain cases is called the host processor, coupled to a host bus 105. A memory 112 normally comprising Dynamic Random Access Memory (DRAM) stores programs to be executed by the processor. The memory can be accessed by the processor 104 via a chip set 108 which provides transfer logic for transactions between the host bus 105 and a PCI bus 116 and between the PCI bus 116 and the memory 112. An I/O bridge 124 gives access to a legacy bus 128.

The following example illustrates the problem of deadlock encountered when performing multiple types of bus transactions. The chip set 108 can process multiple transactions using a pipe. FIG. 2 shows the status of an inbound pipe 130 and an outbound pipe 134. Also shown are outbound pipes 138 and 142 in the I/O bridge 124 and PCI device 120, respectively. The pipes contain several pending requests for transactions which have resulted in a deadlock condition.

Each outbound pipe has a number of entries where each entry can hold transaction information (e.g., request packets containing target address and command information) and transaction data (e.g., data packets containing the transaction data) for posted and non-posted transactions. Posted writes include P-Writes 1 through 3. P-Writes 1 and 2 were initiated by the processor 104 and are directed at a target, e.g. the I/O bridge 124 or the PCI device 120, on the PCI bus 116. P-Writes 1 and 2 are known as downstream transactions. In contrast, P-Write 3 was initiated on the legacy bus 128 and is directed at the main memory 112. Thus, P-Write 3 is an upstream transaction. Examples of non-posted transactions are NP Read 1 in pipe 134 and NP Read 2 in pipe 142. An outbound pipe may also hold return data (as data packets) for a non-posted transaction, such as Read Return 1*a* and 1*b* in pipe 138, Read Return 2 in pipe 134, and Read Return 1 in pipe 142.

Normally, each PCI resource has both an inbound and outbound pipe. The inbound pipe 130 is used to store request packets for upstream non-posted read transactions, return data for downstream non-posted transactions (e.g., Read Return 1*a* for NP Read 1 in the chip set 108), and requests and associated data for upstream posted write transactions. All of the read return data, as specified in the non-posted read transaction, must be received by the chip set and held in an inbound pipe before it is made available to the processor which returns to fetch it.

Although not yet completed, P-Write 3 is targeting the chip set 108 such that the data for this transaction would be stored in the inbound pipe 130 when completed. The transaction information and data stored in the inbound and outbound pipes are processed in a first in first out (FIFO) manner. Thus, for example, in outbound pipe 134, NP Read 1 must be completed before any subsequent transactions or data, such as P-Write 1, in the pipe 134 can be performed on the PCI bus 116.

Two different deadlock conditions are illustrated in FIG. 2. In the first deadlock condition, the pipe 134 has requested read data for the NP Read 1 transaction, directed at the I/O bridge 124. The outbound pipe 138 of the bridge 124 has delivered part of the read data as Read Return 1*a* to the inbound pipe 130. However, the second part of the read data, Read Return 1*b*, became available after P-Write 3 was enqueued in the pipe 138. Thus, any further requests for NP Read 1 by the outbound pipe 134 will be signaled a retry, because P-Write 3 is blocking the pipe 138. Also, any requests for P-Write 3 by the pipe 138 are signaled a retry, because NP Read 1 is blocking the inbound pipe 130. As a result, no data can be transferred to or from the chip set 108 and the I/O bridge 124.

The second deadlock condition illustrated in FIG. 2 occurs when NP Read 1 is directed at PCI device 120 rather than at the I/O bridge 124. The Read Return 1 data for that transaction, however, became available after NP Read 2 was enqueued in the outbound pipe 142 of the PCI device 120. Thus, any requests for NP Read 1 are signaled a retry, because NP Read 2 is blocking pipe 142. Similarly, any requests for NP Read 2 are signaled a retry, because NP Read 1 is blocking pipe 134. Once again, no data can be transferred to and from chip set 108.

One way to avoid the above-described first deadlock condition is to configure a PCI resource as to preclude any posted write from entering the resource's outbound pipe when a non-posted read request has been received over the bus and read return data for that read have not all been completed to the requesting master. A different way to avoid the second deadlock condition is to configure the PCI resource to time out the NP Read at the head of its outbound pipe after a large number of retried attempts. Upon the time out event, the NP Read request packet is discarded from the head of the outbound pipe and the discard status is communicated to control logic at the other side of the pipe to re-issue the same NP Read request. However, the first deadlock-avoidance technique fails to make optimal use of the full capacity of the outbound pipe because the pipe is permitted to hold only the single, non-posted read return. The second deadlock avoidance technique described above is performance-limiting as it allows the NP Read transaction at the head of the outbound pipe to be fruitlessly attempted for a relatively long time at the expense of blocking progress of transactions behind the NP Read and causing the pipe to back up. Therefore, there is a need for a technique of avoiding deadlocks that makes efficient use of the outbound pipe.

SUMMARY

An embodiment of the invention is directed to a method of processing bus transactions by making at least one attempt to perform a first non-posted transaction from an outbound pipe, the outbound pipe having entries corresponding to at least one posted transaction and at least one non-posted transaction, the posted and non-posted transactions to be performed in a first-in first-out manner, bypassing the first transaction in response to it being rejected, performing at least one other transaction from the outbound pipe, and performing the first transaction after performing the other transactions.

These and other features as well as advantages of the different embodiments of the invention will be apparent by referring to the drawings, detailed description and claims below.

DETAILED DESCRIPTION

Figure 2:
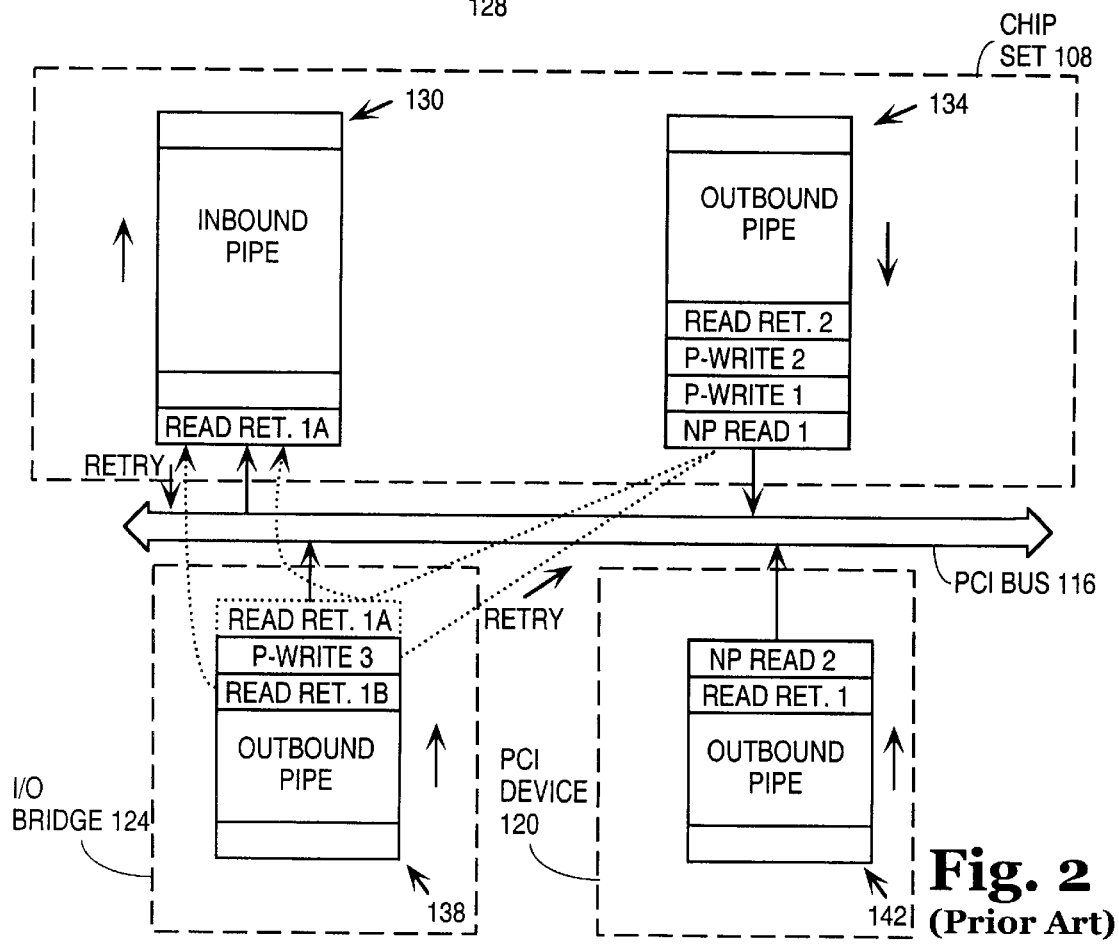
FIG. 2 shows a logical block diagram of the interaction among pipes coupled to a bus and depicting a deadlock condition.
Figure 3:
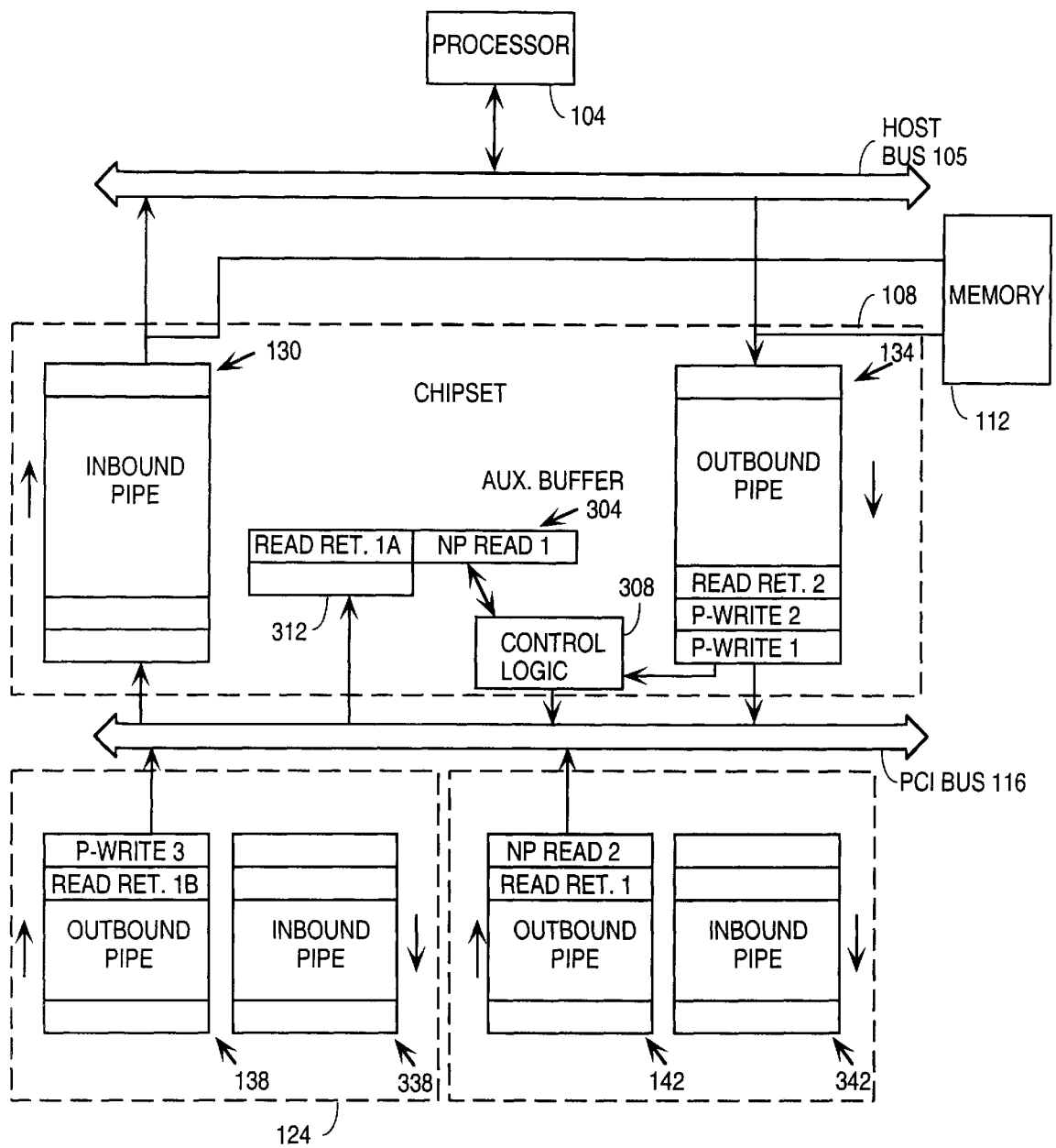
FIG. 3 presents a logical block diagram of a technique for avoiding deadlock according to an embodiment of the invention.

As briefly summarized above, an embodiment of the invention helps eliminate the occurrence of deadlock conditions by in effect providing a passing lane for a non-posted transaction that has reached the head of the outbound pipe but has been rejected and has not been completed over the bus. FIG. 3 presents a logical block diagram of a computer system featuring such a technique for avoiding deadlock. In particular, FIG. 3 shows the status of the conventional system of FIG. 2 enhanced with an embodiment of the invention's deadlock avoidance technique.

According to an embodiment of the invention, an auxiliary buffer 304 is provided in the chip set 108. The buffer 304 holds at least one transaction request packet and has an assembly area 312 for holding data packets. For the example of the first deadlock condition, the request packet corresponds to NP Read 1 and the assembly area contains a portion of the read return data for NP Read 1. Data paths are provided from the bus 116 to the inbound pipe 130 as well as to the assembly area 312. The buffer 304 is coupled to outbound pipe 134 via control logic 308. The control logic 308 moves an unsuccessful request packet from the head of outbound pipe 134 to the auxiliary buffer 304.

It can be appreciated that the deadlock avoidance techniques described herein do not disturb the dependency/ordering relationship that exists between a downstream posted write and a subsequent downstream non-posted read in an outbound pipe. For instance, if P-Write 1 is directed at a target address in the PCI bus 116, and then a subsequent NP Read is issued to the same target address, the NP Read must be performed after P-Write 1. According to an embodiment of the invention, the NP Read is moved aside only after it has reached the head of the pipe and any prior posted writes have been performed. Thus, the ordering relationship is maintained.

Moreover, it has been recognized that there is no ordering relationship to speak of between a non-posted read and a subsequent posted write in the outbound pipe. Accordingly, moving aside the non-posted read, which more likely than not will change the order in which the two transactions are performed as will be appreciated further below, will not disturb proper operation of the computer system.

Figure 1:
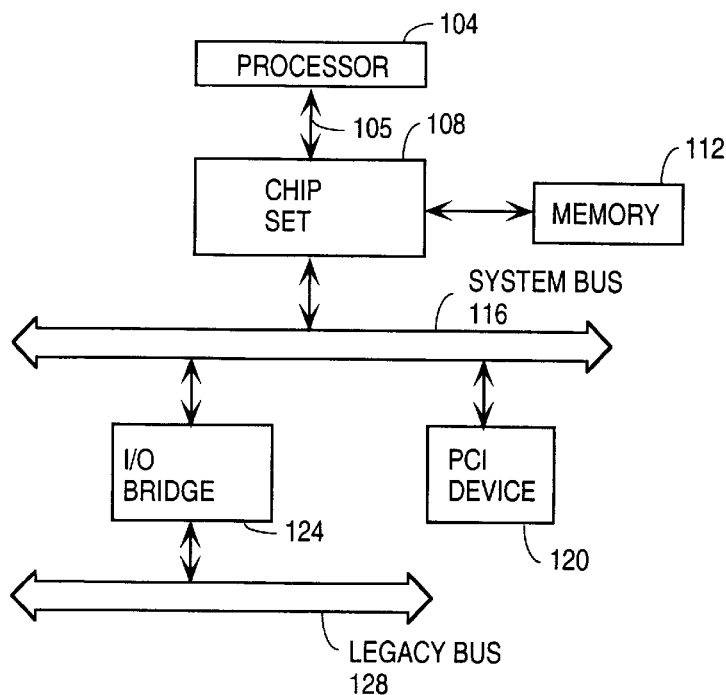
FIG. 1 illustrates a block diagram of a conventional computer system featuring a chip set coupled to a PCI bus.

Returning to FIG. 3, one sequence of operations that may occur now that the unsuccessful NP Read 1 has been moved aside is as follows. Note that in the sequence of operations described, the first deadlock condition described above in the Background section is avoided. The outbound pipe 134 contains transaction information of one or more outbound posted transactions (here, request packets for P-Write 1 and P-Write 2 together with their associated write data packets—not shown). The presence of NP Read 1 in the outbound pipe 134 blocks both outbound and inbound pipes in the chip set 108, until the NP Read 1 has been either completed or removed from the outbound pipe. With the NP Read 1 removed, P-Write 1 is now at the head of the outbound pipe 134 and targets the empty inbound pipe 338 of I/O bridge 124. Although it blocks subsequent transactions behind it from being performed, P-Write 1 can be readily performed since it is now at the head of the pipe 134. Also, because the Read Return 1a has been moved aside from the inbound pipe 130 (it was blocking the pipe 130, preventing transaction data unrelated to the pending NP Read 1 from being accepted from the bus 116), P-Write 3 has a clear path to transfer its data in to pipe 130 of the chip set. After P-Write 3 has been performed and removed from the pipe 138, the remaining Read Return 1b for NP Read 1 can be delivered to an assembly area 312 in the auxiliary buffer 304. This completes the NP Read 1, and the chip set 108 may then deliver the entire read return data Read Return 1a and 1b to the initiator of NP Read 1 (e.g., processor 104, see FIG. 1 momentarily.)

Another sequence of operations following the moving aside of NP Read 1 is as follows, this time avoiding the second deadlock condition described above. The P-Write 1 and P-Write 2 once again have a clear path to their respective inbound pipes (e.g., pipes 338 or 342.) Once these two transactions have been performed, NP Read 2 has a clear path to receive its Read Return 2. Thereafter, NP Read 1 may be completed by delivering Read Return 1 from pipe 142. Once again, deadlock is avoided and all transactions are properly completed without disturbing any required ordering relationships.

Various events and conditions may be used to determine when the non-posted transaction at the head of an outbound pipe is deemed rejected, thus triggering its removal from the pipe. Preferably, the transaction is deemed rejected after receiving the first Retry signal from the target in response to a request from the outbound pipe to perform the transaction. Alternatively, the outbound pipe 134 may be allowed several retried attempts to perform the transaction before labeling the transaction as rejected. Other techniques for triggering the removal of a non-posted transaction from the head of the pipe may be developed and incorporated into the teachings herein by one of ordinary skill in the art.

Figure 4:
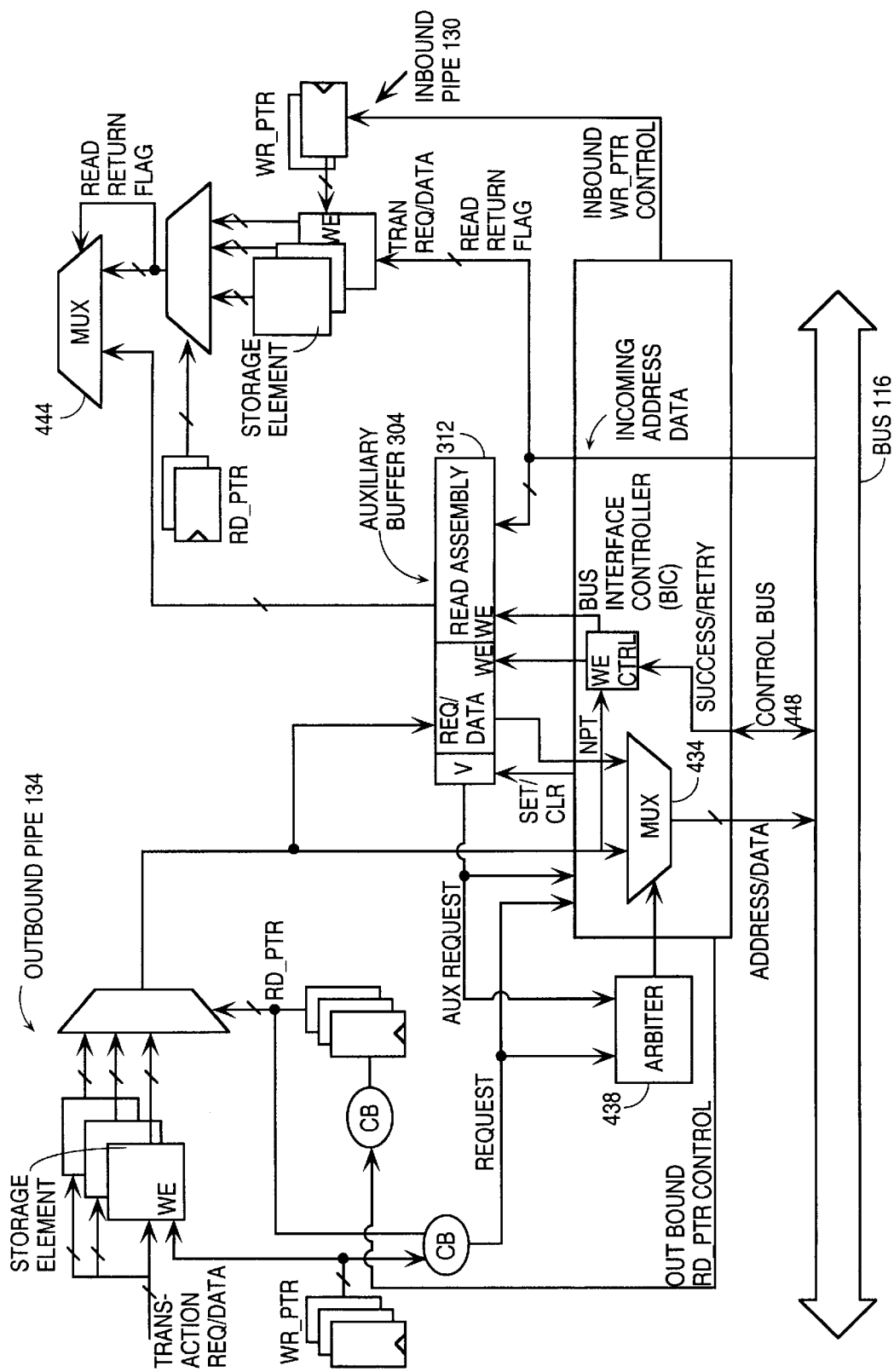
FIG. 4 shows the logic circuitry used to implement an auxiliary buffer and associated control logic according to an embodiment of the invention.

FIG. 4 shows circuitry used to implement the inbound and outbound pipes, control logic 308 and auxiliary buffer 304 used in the chip set 108, according to an embodiment of the invention. The outbound pipe 134 comprises a number of storage elements, each storage element receiving transaction request and data packets over a common bus. The request and data packets are received from an initiator of the transaction (not shown). The initiator may be the processor 104 or another device coupled to the chip set 108 that may wish to access the bus 116. A read pointer rd_ptr is provided to select the element at the head of the outbound pipe 134. A write pointer wr_ptr selects the next available (free) element at the tail of the outbound pipe 134. The pipe operates as a FIFO structure.

The inbound pipe 130 has a structure similar to the outbound pipe 134. However, its transaction request and data packets are received from the bus 116 and delivered to an interface on another side of the chip set 108. The interface may be to the processor 104 which initiated a downstream non-posted read transaction and expects read data to return.

Alternatively, the interface may be to the memory 112 being the target of an upstream posted write or non-posted read. There are many other resources that may be connected to the chip set 108 for communicating with the bus 116 using the inbound and outbound pipes.

The auxiliary buffer 304 can store the request and data packets for at least one non-posted read or write transaction. Data paths exist between the storage elements of the outbound pipe 134 and the auxiliary buffer 304 to transfer transaction request and data packets. For reads, an assembly area 312 is provided that has sufficient space to receive all return data associated with a non-posted read. Data paths exist from the bus 116 to the assembly area 312 as well as to the inbound pipe 130 storage elements. Read return data is routed to the assembly area 312 whereas upstream posted write address/data is sent to the inbound pipe 130 storage elements.

A first multiplexer 434 is provided to forward a request/data packet from either the head element of the outbound pipe 134 or the auxiliary buffer 304 to the bus 116. An arbiter 438 decides which to select based on requests from the respective pipes. Moving to the inbound side, a second mux 444 forwards the read return data from either the assembly area 312 or an element of the inbound pipe 130 to a requesting initiator (not shown.) The selection between these two is made in response to a Read Return Flag of a Special Packet in the inbound pipe 130. As will be explained below, the Flag of the Special Packet is set by the Bus Interface Controller (BIC) in response to successfully completing a non-posted read transaction from either the auxiliary buffer 304 or the outbound pipe 134.

The BIC performs requests and acceptances of transactions over the bus 116. The first mux 434 will normally be part of BIC logic. The BIC provides a control signal for updating the outbound rd_ptr as request/data packets are popped from the outbound pipe 134 and performed on the bus 116. The BIC asserts a write enable (WE) to the auxiliary buffer 304 when it is time to latch the request packet of a retried non-posted transaction as it is popped and moved aside from the outbound pipe 130. The BIC also asserts a WE to the read assembly area 312 as read data becomes available over the bus 116 for a non-posted read transaction. The Read Return Flag is set by the BIC when the non-posted read is completed and the read assembly area 312 contains the complete return data received from the bus 116. The BIC then enqueues the Special Packet, with the Read Return Flag set, into the inbound pipe 130.

Operation of the circuitry in FIG. 4 will be described using the example that created the first deadlock described above in the Background in relation to FIG. 2. The second deadlock may be handled in a similar manner and will not be discussed. Assume that all rd_ptr and wr_ptr have been properly initialized, the auxiliary buffer 304 is empty, the Valid bit of the auxiliary buffer is clear, and the status of the pipes 130, 134 and 138 are as shown in FIG. 2. Note that pipe 142 is not relevant to the first deadlock condition.

A non-posted transaction (here NP Read 1) arrives in the outbound pipe 134, and is accordingly placed at its head. Since the Valid bit is clear, indicating that a request from the auxiliary buffer 304 is not valid, the arbiter 438 selects the request/data from the head of the outbound pipe 134. The BIC then attempts to perform this request for NP Read 1 over the bus 116.

The NP Read 1 request is at first partially successful, as sensed by the BIC through the control bus 448, and the BIC accepts incoming data Read Return 1a which is stored at a first location of the read assembly area 312 by asserting WE. However, Read Return 1b does not become available in a timely fashion, and the target (here outbound pipe 138 of the I/O bridge 124, see FIG. 2) disconnects the BIC. Arbitration then moves to other bus agents, and eventually returns to the outbound pipe 134. However, this time the NP Read 1 request is rejected as a Retry termination from the target is sensed over the control bus 448.

In addition to detecting the Retry, the BIC also recognizes that the rejected request was for a non-posted transaction (NPT) as revealed by the signal NPT from the corresponding storage element of the outbound pipe 134. Accordingly, a WE for the auxiliary buffer 304 is generated, allowing the request packet for NP Read 1 to be stored in the auxiliary buffer 304 and the buffer being marked Valid.

After the unsuccessful NP Read 1 is moved to the auxiliary buffer 304, the rd_ptr of the outbound pipe 134 is updated to point to the subsequent storage elements. The status of the pipes in the overall system are as shown in FIG. 3. Staying with FIG. 3, arbitration will move to the next bus agent in line behind the outbound pipe 134. This gives all requesting bus agents an equal opportunity to own the bus 116. For this example, assume that the next in line is outbound pipe 138 requesting the bus 116 to perform P-Write 3. This transaction may now be readily completed because the blockage of inbound pipe 130 caused by NP Read 1 Read Return 1a has been cleared. Following P-Write 3, assume that arbitration moves to the auxiliary buffer 304 whose request is now valid because the Valid bit is set.

When the auxiliary buffer 304 is granted a request to own the bus 116, the arbiter selects the current request packet, from the auxiliary buffer 304, which happens to be NP Read 1. This time, the transaction may be completed as Read Return 1b is now at the head of the outbound pipe 138 and thus available for transfer. The BIC asserts WE to a second location of the read assembly area 312 and the 1b return data is received from the bus 116. When the read is complete, the BIC removes the NP Read 1 packet, but not the return data, from the auxiliary buffer 304. This may be done by, for example, clearing the Valid bit. Arbitration then moves to the next request in line. Thus, the NP Read 1 has been performed and the deadlock condition has been avoided.

After a read to the assembly area 312 is complete, the BIC enqueues a Special Packet in the inbound pipe 130, in an element indicated by the wr_ptr for that pipe. The Packet represents the completed read transaction (here NP Read 1), and comprises a Read Return Flag set by the BIC and the complete amount of return data that has been received in the assembly area 312. This amount may be represented by, for instance, the number of data words that have been received for Read Return 1a and 1b. The Special Packet indicates to control logic at the top of the inbound pipe 130 that the complete return data associated with NP Read 1 is available in the read assembly area 312 of the auxiliary buffer 304. When the Packet reaches the top of the inbound pipe 130, the Read Return Flag, through the second mux 444, selects data from the assembly area 312 rather than from a storage element of the inbound pipe 130. The correct amount of return data, as indicated by the Special Packet, is then delivered to the proper interface. Thereafter, the Special Packet is removed from the inbound pipe 130. The assembly area 312 is now available for assembling return data for the next non-posted read transaction. Note that normal packets in the inbound pipe 130 for which the Flag is clear will usually correspond to an upstream transaction such as a posted write or non-posted read requested by a bus master on the bus 116. The upstream write would select its data packet from the corresponding storage element of the inbound pipe 130, whereas the non-posted read would have a request packet but no data packet associated with it.

To summarize, various techniques for avoiding deadlock while making optimal use of an outbound pipe have been described. The embodiments of the invention described above are, of course, subject to some variations in structure and implementation. Although the techniques were illustrated using a chip set that complies with the PCI specification, one of ordinary skill in the art will recognize that the invention may be practiced in other settings as well, including other bus specifications and non-bridge devices. Therefore, the scope of the invention should be determined not by the embodiments illustrated but by the appended claims and their legal equivalents.

What is claimed is:

1. A method of processing bus transactions, comprising:
    making at least one attempt to perform a first non-posted transaction from an outbound pipe, the outbound pipe having storage elements corresponding to at least one posted transaction and at least one non-posted transaction, the posted and nonposted transactions to be performed in a first-in first-out manner;
    bypassing the first transaction in response to the first transaction being rejected and storing transaction information corresponding to said first transaction in an auxiliary buffer, and performing at least one other transaction from the outbound pipe; and
    performing the first transaction from the auxiliary buffer after performing the at least one other transaction.

2. The method of claim 1 wherein the first non-posted transaction is a read and the at least one other transaction is a posted write.

3. The method of claim 1 wherein the first non-posted transaction is a downstream read and the at least one other transaction comprises return data for an upstream read.

4. A device for communicating with a bus, comprising:
    an outbound pipe for storing transaction information of one or more posted transactions and one or more non-posted transactions, the posted and non-posted transactions to be performed by the device over the bus in a first-in first-out (FIFO) manner from a head of the pipe;
    an auxiliary buffer coupled to the outbound pipe and for storing transaction information of at least one non-posted transaction; and
    control logic for causing transaction information of a rejected non-posted transaction at the head of the outbound pipe to be copied to the auxiliary buffer in response to a retried attempt to perform said rejected transaction from the outbound pipe.

5. The device of claim 4 further comprising
    a read assembly area of the auxiliary buffer for storing transaction data received from the bus and associated with said rejected transaction.

6. The device of claim 4 wherein a posted transaction at the head of the outbound pipe prevents subsequent transactions in the outbound pipe from being performed until the posted transaction has been completed or removed from the outbound pipe.

7. The device of claim 4 wherein said retried attempt comprises receiving a retry termination over the bus from a target of said rejected transaction.

8. The device of claim 4 wherein the outbound pipe is for further storing return data of a non-posted read transaction initiated over the bus and directed at the device.

9. The device of claim 4 wherein said control logic is further configured to update a head pointer for the outbound pipe to point to a subsequent transaction behind the rejected transaction without the rejected transaction being completed.

10. The device of claim 4 further comprising
    an arbiter for determining a bus master in response to requests from the outbound pipe and said auxiliary buffer.

11. A computer system comprising:
    a first bus;
    a second bus;
    a bridge coupled between the first and second buses, the bridge having an outbound pipe with storage elements corresponding to one or more posted transactions and one or more non-posted transactions, the posted and non-posted transactions having been initiated on the first bus to be transported by the bridge to the second bus in a first-in first-out manner,
    the bridge bypassing a first non-posted transaction of the outbound pipe in response to receiving a retry termination from a target of said transaction, and then completing at least one other transaction from the outbound pipe, and then completing the first transaction;
    an auxiliary buffer for storing transaction information corresponding to said first transaction; and
    an arbiter for determining a bus master in response to a request from said auxiliary buffer to perform said first transaction and a request from the outbound pipe to perform a subsequent transaction behind the first transaction.

12. The system of claim 11 wherein the bridge further comprises an inbound pipe coupled between the first and the second buses, the bridge enqueuing a special packet in the inbound pipe representing said first transaction after receiving complete return data for said transaction.

13. The system of claim 12 wherein the bridge further comprises an assembly area separate from the inbound pipe for storing said complete return data.

14. The system of claim 12 wherein the special packet moves through the inbound pipe in a FIFO manner with at least one upstream posted write being ahead of the special packet.

* * * * *